March 29, 1966 J. W. ERICKSON 3,243,731

MICROWAVE SINGLE SIDEBAND MODULATOR

Filed June 18, 1962 4 Sheets-Sheet 1

INVENTOR.
JON W. ERICKSON

BY Spencer E. Olson

ATTORNEY

March 29, 1966 J. W. ERICKSON 3,243,731

MICROWAVE SINGLE SIDEBAND MODULATOR

Filed June 18, 1962 4 Sheets-Sheet 2

INVENTOR.
JON W. ERICKSON

BY Spencer E. Olson

ATTORNEY

INVENTOR.
JON W. ERICKSON

BY Spencer E. Olson
ATTORNEY

March 29, 1966 J. W. ERICKSON 3,243,731

MICROWAVE SINGLE SIDEBAND MODULATOR

Filed June 18, 1962 4 Sheets-Sheet 4

INVENTOR.
JON W. ERICKSON

BY Spencer E. Olson
ATTORNEY

United States Patent Office 3,243,731
Patented Mar. 29, 1966

3,243,731

MICROWAVE SINGLE SIDEBAND MODULATOR

Jon W. Erickson, Buffalo, N.Y., assignor to Sylvania Electric Products Inc., a corporation of Delaware Filed June 18, 1962, Ser. No. 203,216
6 Claims. (Cl. 332—43)

This invention relates generally to modulators and is more particularly concerned with a solid state single sideband suppressed carrier modulator for operation at microwave frequencies.

A number of methods are known for generating single sideband radio frequency signals. One is the frequency discrimination technique, wherein a balanced moduator and a sideband filter eliminate the radio frequency carrier and undesired sidebands, respectively. This system, however, suffers the disadvantage that if the lowest modulation frequency is low, say 100 cycles per second, it is difficult to design a sideband filter capable of separating two sideband signals 200 cycles per second apart at carrier center frequencies which are high compared to the modulation frequencies. This difficulty dictates the use of a multiple modulation system which makes the generator complicated and costly. Another disadvantage of this approach is the difficulty of changing the frequency of the RF carrier and selecting the upper or lower sideband.

Another known system, the composite amplitude and phase modulation approach, is subject to signal distortion at large amplitude indices, and the second order sideband is only 5.2 db below the amplitude of the first order sideband. Since the second order sidebands cannot be filtered without causing an excessive signal distortion, nor can they be canceled, the primary objective of the system is not realized and adjacent channel cross-talk occurs. In a variation of this approach, known as "controlled carrier" operation, the carrier remains in the output when no modulation information is transmitted; consequently, excess power is needed over that required for single sideband suppressed carrier operation. Moreover, since this approach employs two serial modulators, the total conversion loss is of the order of sixteen db, assuming a reasonable conversion loss of eight db per modulator.

In another known technique for producing single sideband suppressed carrier modulation, the phase discrimination approach, the primary design problems are achieving proper tolerance for the carrier, the suppression of undesired sidebands over a wide modulating frequency range, and provision of means for tuning the frequency of the carrier. These, in turn, dictate a close control of power levels into and out of the respective balanced modulators. In addition, undesired differential phase shifts between the two modulators must be minimized by network design and control of radio frequency path lengths. Compared to the filter approach, the phase discrimination approach is less complicated and consequently is capable of smaller size and weight realization, and higher reliability under severe environmental conditions. Compared to the phase modulation approach, the phase discrimination technique provides better carrier and undesired sideband suppression. A problem arises, however, when it is desired to generate a relatively high power level single sideband output at microwave frequencies. If a high level carrier is applied to conventional crystal modulators, the efficiency is relatively poor. Crystal modulators have a predominantly non-linear resistance characteristic and therefore dissipate power. At the lower frequencies, this problem is overcome by modulating at a low input carrier power level and thereafter amplifying the single sideband output in a linear amplifier. However, amplifiers capable of linear operation at microwave frequencies are not presently available.

With an appreciation of the foregoing and other shortcomings of available modulators, applicant has as a primary object of the present invention to provide a single sideband modulator having a relatively high conversion efficiency for relatively high power level modulation at microwave frequencies and good carrier and undesired sideband suppression.

Another object of the invention is to provide a microwave single sideband modulator package of minimum volume and weight.

Still another object of the invention is to provide a compact microwave single sideband modulator package wherein the active elements are easily accessible for replacement and the tuning means are positioned for easy adjustment.

Briefly, these objects are achieved by packaging a phase discrimination type of single sideband suppressed carrier modulator in a unitary assembly utilizing strip transmission line and coaxial line circuitry. A unique three dimensional transistion is employed to couple coaxial line elements to the associated strip transmission lines. Efficient, relatively high power, modulation at microwave carrier frequencies is achieved by using varactors as the modulating elements in a pair of balanced modulators, together with modified 3 db hybrid couplers, to generate double sideband (suppressed carrier) outputs from each balanced modulator. Since the varactors have a predominantly non-linear reactive characteristic, they are essentially lossless. The phased, double sideband outputs from the balanced modulators are summed by another modified 3 db hybrid coupler to obtain either the upper or lower sideband. The varactors and their tuning elements are incorporated in a coaxial transmission line configuration, while the hybrid couplers and their interconnections are formed of strip transmission line.

Other objects, features and advantages of the invention, and a better understanding of its construction and operation will be apparent from the following detailed description, take in conjunction with the accompanying drawings, in which.

Figure 1:
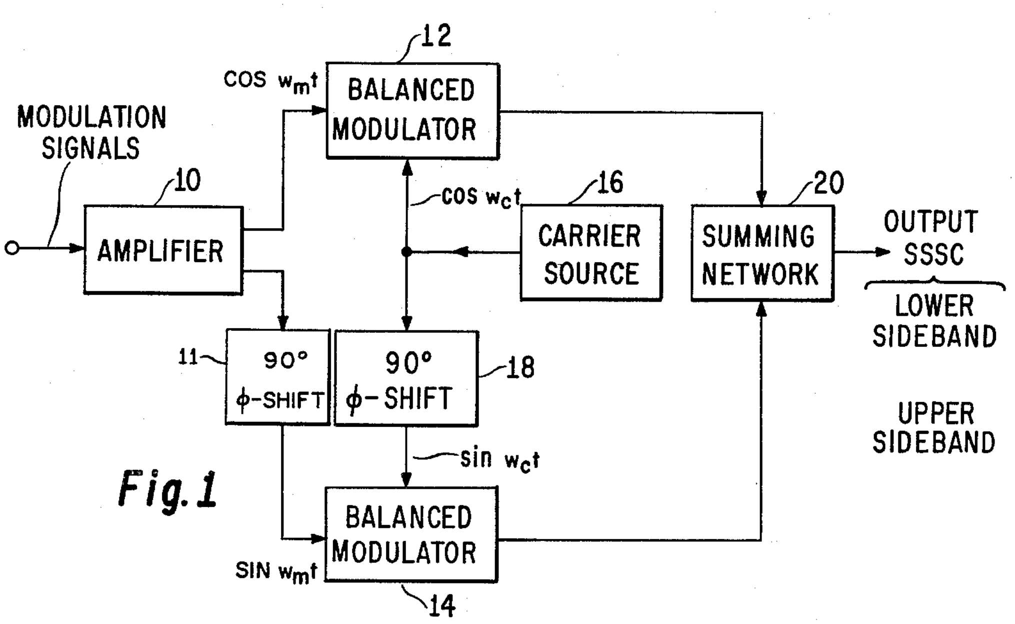
FIG. 1 is a block diagram of a single sideband suppressed carrier modulator of the phase discrimination type.

Referring now to FIG. 1 of the drawings, the present modulator employs phase discrimination modulation at high power level. The modulation signal, which may be either FM or AM, is applied to an information amplifier 10, the output of which is applied, unshifted, to a balanced modulator 12 and through a 90° phase shifter 11 to a balanced modulator 14; thus, there is a 90° phase difference in the modulation signal inputs to the balanced modulators, and the signal applied to modulator 12 may be expressed as cos $w_m t$ and the signal applied to modulator 14 may be expressed sin $w_m t$. Amplifier 10 provides a control on gain so that the level of the information signal input to the balanced modulators can be controlled. A carrier signal from source 16 is applied, unshifted, to modulator 12, which may be expressed cos $w_c t$, and is applied through a 90 degree phase shifter 18 to modulator 14; the shifted carrier may be designated sin $w_c t$. The individual balanced modulators each suppress the carrier frequency while generating both the upper and lower sidebands. The output of balanced modulator 12 is applied to a summing network 20 along with the output of balanced modulator 14. From the summing network either the lower sideband or the upper sideband of the modulated carrier is available at an output terminal. A significant aspect of the present invention is that varactors are used as the active elements in the balanced modulators, and the modulators, the 90 degree phase shifter 18 and the summing network 20 are strip transmission line 3 db directional couplers.

Figure 2:
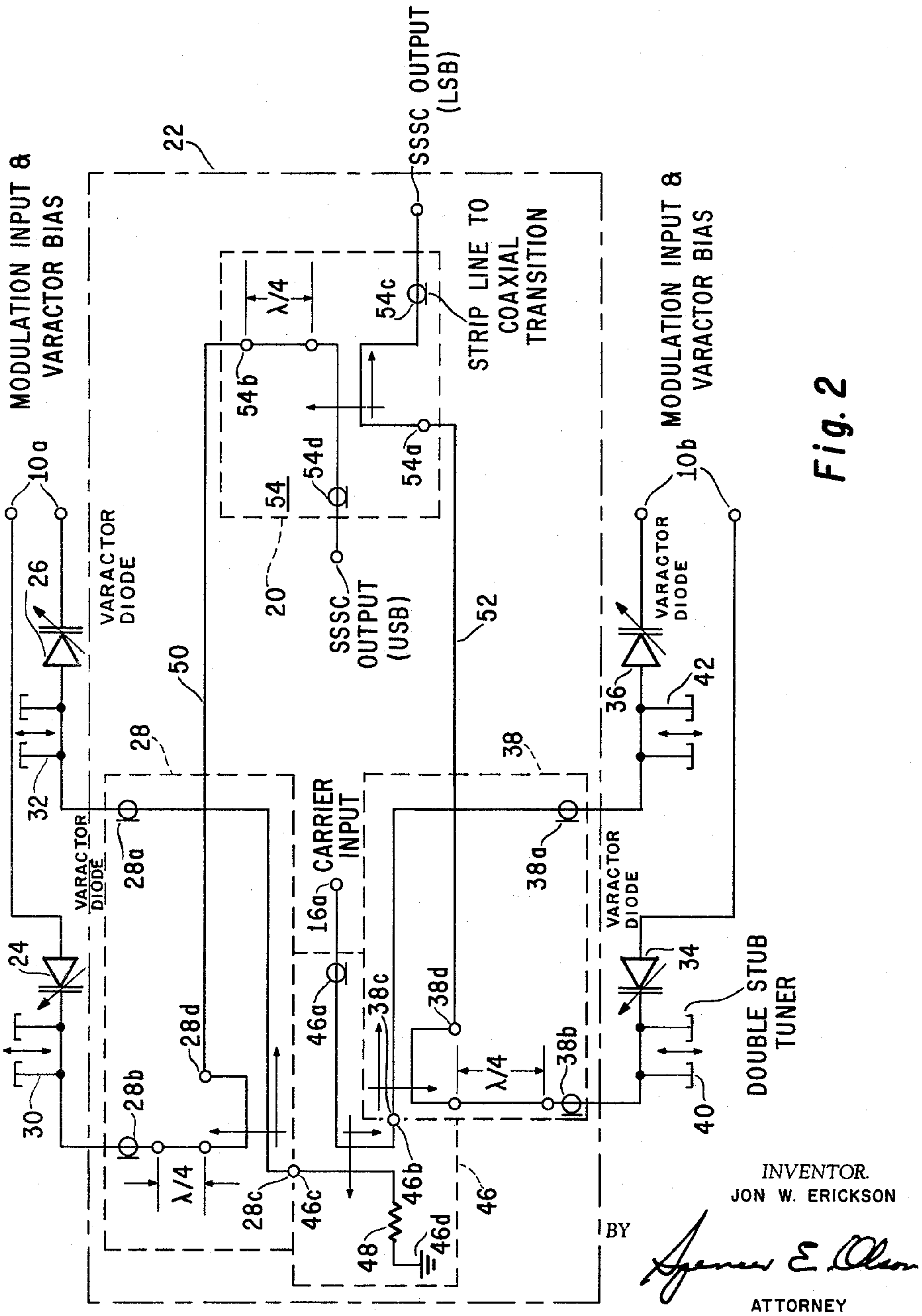
FIG. 2 is a microwave schematic diagram embodying the invention, of the modulator of FIG. 1.

The manner in which the varactors and directional couplers are combined to give the above described operation is illustrated in the microwave schematic diagram of FIG. 2. Each balanced modulator includes two varactors connected to terminate opposite ports of a modified 3 db hybrid coupler. The directional couplers, of which there are one conventional and a total of three modified, are all fabricated of strip transmission line and are contained in a unitary assembly, represented by the dot-dash line enclosure 22. The varactors are mounted in a coaxial transmission line circuit and are matched by double stub tuners of the coaxial line type, these components appearing outside the dot-dash enclosure 22.

Considering the diagram of FIG. 2 in more detail, balanced modulator 12 (FIG. 1) includes a pair of varactors 24 and 26, oppositely poled as indicated, and a modified 3 db hybrid coupler, represented by the dotted enclosure 28, the elements therein and the operation of which will be more fully described hereinafter. The modulation signal from amplifier 10 (FIG. 1) is applied to both varactors via terminals **10*a*, the varactors being separately biased over their respective signal conductors from a source not shown. A pair of double stub tuners 30 and 32 are respectively connected between varactor 24 and one input port of coupler 28 and between varactor 26 and another input port of coupler 28**. By separately biasing the varactors and employing tuners to match the varactors to the characteristic impedance of the coupler, it is possible to obtain operation on that portion of the varactor characteristic which gives optimum conversion efficiency and maximum suppression of undesired frequencies. The desired operating point is that at which the reflection coefficient for all varactors is identical in magnitude and phase. The tuning flexibility provided by the double stub tuners facilitates interchangeability of varactors without degradation of performance.

The other balanced modulator includes varactors 34 and 36 respectively connected to the two input ports of a second directional coupler 38, and a pair of double stub tuners 40 and 42 connected as described above for matching the varactors to the coupler. The shifted modulation signal is applied to both varactors via terminals **10*b*** and the varactors are separately biased from separate sources (not shown) over the respective signal input lines.

The carrier signal from source 16 (FIG. 1) is applied via terminal **16*a* to a contradirectional 3 db coupler 46, the action of which inherently gives the required 90 degree phase shift of the carrier applied to balanced modulator 14. Considering coupler 46 in greater detail, the carrier signal is applied to its input port 46*a*, and because of the 90 degree phase shift in the coupler, the carrier shifted 90 degrees with respect to the input signal appears at port 46*b*, which is directly connected to port 38*c* of coupler 38. The carrier, unshifted, is coupled to an adjacent arm of the hybrid and is applied through port 46*c* directly to port 28*c* of coupler 28. The remaining port 46*d* of coupler 46 is connected to ground through a load 48**.

The outputs from the two balanced modulators, appearing at ports **28*d* and 38*d* of couplers 28 and 38, respectively, are applied to the summing network 20 (FIG. 1) via conducting paths 50 and 52. The summing circuit comprises another four-port modified 3 db hybrid coupler 54, similar in design to couplers 28 and 38. The output signal from coupler 28 is applied to one input port 54*b* of coupler 54, and the output from coupler 38 is applied to the opposite port 54*a* of the coupler. The coupler operates (in a manner to be described) to combine the signals applied at the two input ports to cause the lower sideband of the single sideband suppressed carrier output to appear at port 54*c* and the upper sideband to appear at port 54*d***.

Figure 3:
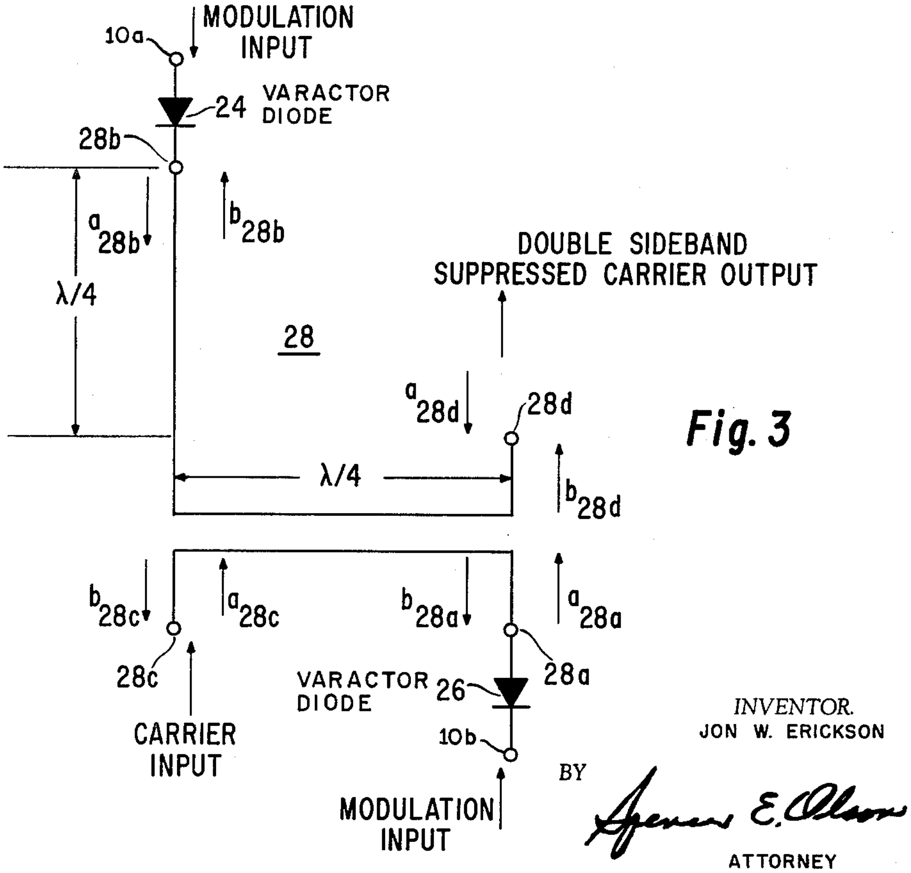
FIG. 3 is a schematic diagram of one of the balanced modulators of the system of FIG. 2, useful in explaining its operation.

The manner in which the modified 3 db hybrid coupler functions to produce a double sideband suppressed carrier output will be better understood from an analysis of the transmission and reflection characteristics of the terminations at each arm of the hybrid. Referring to FIG. 3, wherein coupler 28 of FIG. 2 and its associated varactors 24 and 26 is depicted, a radio frequency signal entering port **28*c* is coupled into the adjacent arms of the hybrid. The coupler itself being a quarter wavelength long at the carrier frequency, the path lengths to ports 28*a* and 28*b*, at which the varactor diodes are connected, are made identical by the addition of a quarter wavelength long conductor in the arm connected to port 28*b*. This modification of the conventional 3 db hybrid provides the desired carrier suppression as will be seen hereinafter. The effect of the application of the modulation signal to the varactors 24 and 26** is to vary their impedance as the modulation voltage sweeps through the non-linear capacitance region of the varactor.

Since the reflection coefficient versus bias voltage characteristic of commercial varactors is non-linear, the modulation input wave form must be effectively distorted before being applied to the varactors of the balanced modulator. This effective distortion may be accomplished by: (1) purposely distorting the modulation waveform in amplifier 10 (FIG. 1) prior to application to the varactors; (2) purposely using self-bias of the varactor to linearize the capacity versus bias voltage characteristics; or (3) employing a combination of (1) and (2) to obtain the desired performance over wide modulation and carrier frequency bandwidth and amplitudes.

Assuming a linear reflection coefficient versus bias voltage relationship, obtained by one of the above approaches, the reflection coefficient of the varactor can be represented by:

$$g=g_0 \cos \omega_m t$$

where $g_0$ is a constant and $\omega_m/2\pi$ is the modulation frequency. Modulation voltages of equal phase and magnitude are applied to both varactors via terminals **10*a* and 10*b***.

A scattering matrix of a bybrid junction may be expressed:

$$\frac{1}{\sqrt{2}}\begin{vmatrix} 0 & 1 & 0 & 1 \\ 1 & 0 & j & 0 \\ 0 & j & 0 & -j \\ 1 & 0 & -j & 0 \end{vmatrix}$$

The input signals to coupler 28 of balanced modulator 12 may be expressed:

$$a_{28c}=\cos \omega_c t$$

$$a_{28a}=g_0\frac{1}{\sqrt{2}} \sin \omega_c t \cos \omega_m t$$

$$a_{28d}=0$$

$$a_{28b}=-g_0\frac{1}{\sqrt{2}} \sin \omega_c t \cos \omega_m t$$

where $\omega_c/2\pi$ is the frequency of the carrier wave incident at port 28c. The input signals at ports 28a and 28b of the hybrid are opposite in sign since the varactors are oppositely poled, and each include the product term sin $W_ct$ since the carrier input signal cos $W_ct$ is phase shifted 90° by a quarter wavelength section in each of the respective paths from port 28c to ports 28a and 28b.

The output signals from the four terminals of coupler 28 of balanced modulator 12 are then found to be:

$$b_{28c}=0$$

$$b_{28a}=\frac{1}{\sqrt{2}}\cos\omega_c t$$

$$b_{28d}=\frac{j}{2}g_0\,[\sin(\omega_c t+\omega_m t)+\sin(\omega_c t-\omega_m t)]$$

$$b_{28b}=\frac{1}{\sqrt{2}}\cos\omega_c t$$

The carrier and modulation frequency inputs to balanced modulator 14 are in phase quadrature with respect to the inputs at 12. As previously described, the inherent phase shift and power split of a contradirectional 3 db coupler 46 provide the 90° phase shift for the carrier, while the modulation signal is shifted by phase-shifter 11. The inputs to coupler 38 of balanced modulator 14 may be expressed.

$$a_{38c}=\sin\omega_c t$$

$$a_{38a}=-g_0\frac{1}{\sqrt{2}}\cos\omega_c t\sin\omega_m t$$

$$a_{38d}=0$$

$$a_{38b}=g_0\frac{1}{\sqrt{2}}\cos\omega_c t\sin\omega_m t$$

As in the case of coupler 28, the input signals at ports 38a and 38b of coupler 38 are opposite in sign due to the opposite polarity of the varactors, and each include the product term cos $w_ct$ due to the 90° path phase shift of the carrier input signal sin $w_ct$.

The output signals from coupler 38 of balanced modulator 14 then become:

$$b_{38c}=0$$

$$b_{38a}=b_{38b}=\frac{1}{\sqrt{2}}\sin\omega_c t$$

$$b_{38d}=\frac{j}{2}g_0\,[\sin(\omega_c t-\omega_m t)-\sin(\omega_c t+\omega_m t)]$$

With the outputs taken from ports 28d and 38d it will be noted that each balanced modulator has suppressed the carrier and modulation frequencies, while generating both the upper and lower sidebands. However, the lower sidebands are in phase while the upper sidebands are 180° out of phase.

When the two balanced modulator outputs are fed into the summing 3 db hybrid 54, a scattering matrix analysis identical to that shown above gives as the outputs of the summing network:

$$b_{54c}=g_0\sin(\omega_c t-\omega_m t)$$

$$b_{54a}=b_{54b}=o$$

$$b_{54d}=g_0\sin(\omega_c t+\omega_m t)$$

Either the upper or the lower sideband is available at the output. The amplitude of the modulated signal is proportional to $g_0$, and the conversion efficiency of the modulator is optimized when $g_0$ becomes unity. The amplitude of the reflection coefficient, $g_0$, implies that varactors with a high cut-off frequency be utilized. That is, the capacitive reactance may be much larger than the series resistance of the diode at the frequency of operation throughout the entire modulated bias voltage.

Figure 4:
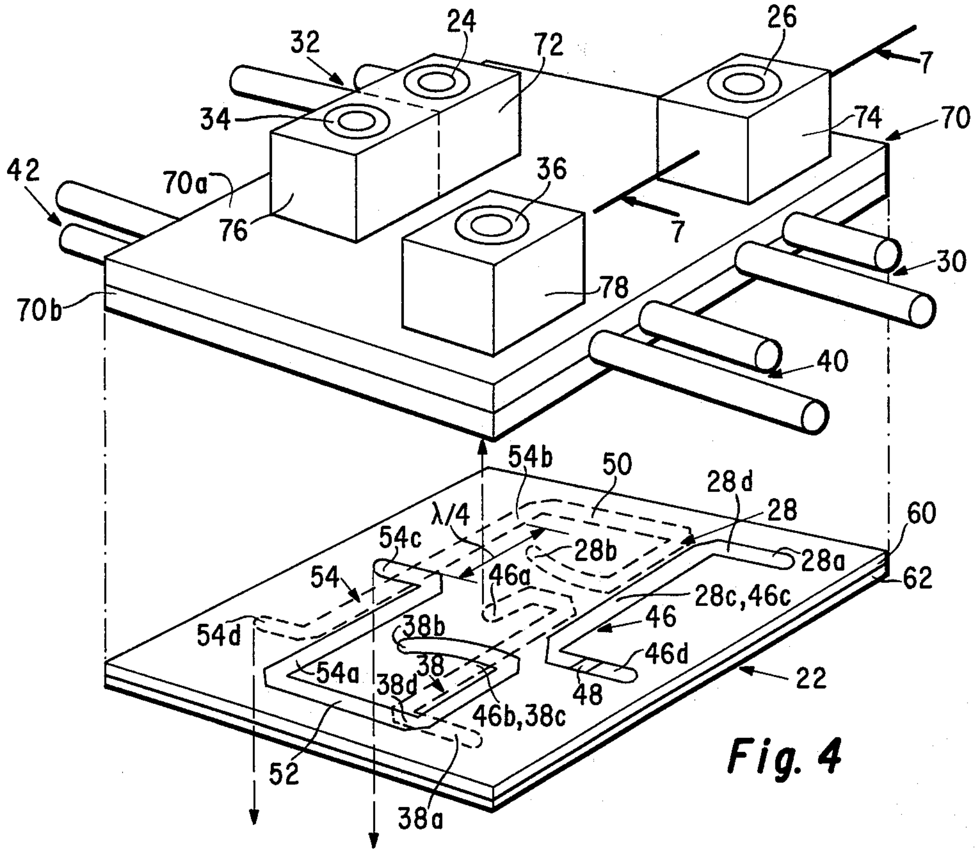
FIG. 4 is an exploded perspective view of a preferred form of packaging the system of FIG. 2.

Having described the modulator in terms of the schematic diagram of FIG. 2, reference is now made to FIG. 4 which shows in outline form a three dimensional coordinate system of packaging the components of FIG. 2. FIG. 4 is an exploded view, the upper section comprising a tunable coaxial transmission line unit which includes the double-stub tuners and on which the varactors are mounted (the elements outside the dot-dash enclosure 22 of FIG. 2), and the lower section 22 is a strip transmission line printed circuit assembly in which all of the components within the dot-dash enclosure 22 of FIG. 2 are contained. When assembled, the strip transmission line assembly 22 is secured to the under surface of the top portion with appropriate connections provided between the coaxial line portion and the strip line portion as will be fully described hereinafter. An assembly corresponding to that of FIG. 4 which has been constructed and satisfactorily operated was approximately three and one-quarter inches square and had an overall thickness of approximately one and one-quarter inches.

Figure 5:
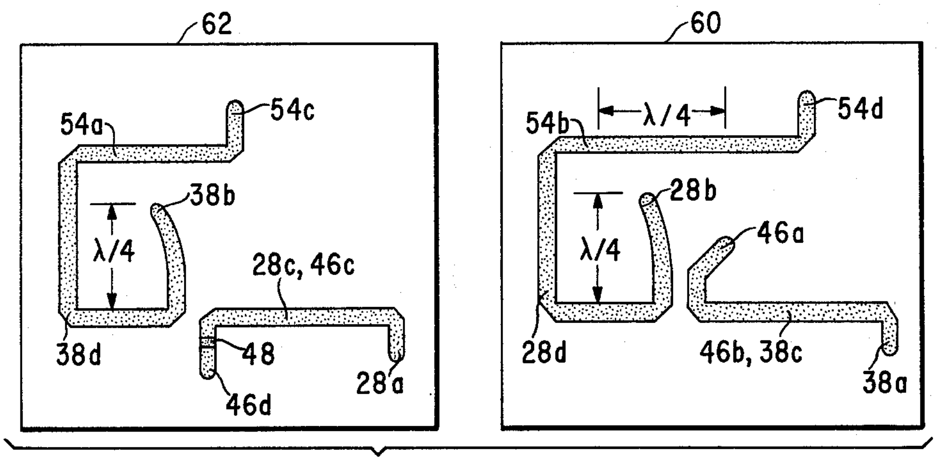
FIG. 5 is an "open-book" plan view of the lower portion of the assembly of FIG. 4.

The construction of the printed circuit strip transmission line portion of the assembly will now be described with reference to the lower portion of FIG. 4 and to FIG. 5, the latter being an "open book" view of two printed circuit boards which are assembled one over the other to form assembly 22. More specifically, the assembly 22 consists of a pair of circuit boards 60 and 62 each having conductive paths formed on one surface thereof in appropriate configuration to form, when assembled, the four directional couplers and the interconnections therebetween described in connection with FIG. 2. Referring to FIG. 5, the assembly 22 may be visualized by folding printed circuit board 60 over board 62 with the printed conductors on the two boards confronting each other. The conductive paths in the regions of broadside coupling between boards 60 and 62, are insulated from each other by a sheet of dielectric tape, such as Teflon, sandwiched between the two boards. The positional relationship of the strip transmission line conductors can better be seen in FIG. 4, where the conductors shown in solid lines are those on board 62, and the conductive paths shown in dotted lines are those on board 60. It is to be understood, however, that all of the conductors are sandwiched between boards 60 and 62 and normally would all appear as dotted lines, and that this departure form drafting convention is for the sake of clarity. Further, FIG. 4 shows the solid and dotted line conductive paths as closely adjacent to one another, whereas in actuality they are precisely aligned one over the other so as to provide broadside-coupling of the conductors to form the 3 db hybrid couplers having the characteristics described earlier. The two boards 60 and 62, with the sheet of Teflon tape sandwiched between them in the regions of broadside coupling, are bonded together and provide a microwave circuit including the hybrid couplers 28, 38, 46 and 54 schematically shown in FIG. 2. In FIGS. 4 and 5 the ports of the several couplers are labelled to correspond with the schematic diagram of FIG. 2.

The manner in which the conductive paths of the strip transmission line assembly 22 cooperate to perform the functions outlined in the description of FIG. 2 will be apparent from the following analysis. The carrier signal is applied to port 46a through a coaxial-to-strip transmission line transition attached to the underside of board 60, the construction of which will be described hereinafter. The port 46a is connected via a short conductive path to a straight section which is broadside-coupled to another straight section (to form coupler 46) the straight section continuing through another broadside-coupled portion (to form coupler 38) and is terminated at port 38a. Port 38a is connected through a transition (to be described) to varactor 36 and its associated tuner 42 contained in the upper portion of the assembly of FIG. 4. The short section of the just-described conductive path lying between the two coupled portions constitutes ports 46b and 38c, which are connected one to the other.

Varactor 24 and its associated tuner 30 are connected through a suitable transition to port 28*b*, which, in turn, is connected through a conductive path having a length equal to an odd multiple of quarter wavelengths at the carrier frequency to a coupled section which constitutes coupler 28 having an output port 28*d*. A relatively long conductive path 50 connects port 28*d* to port 54*b*, the latter, in turn, being connected through a quarter wavelength long conductive path to another coupled portion to form coupler 54. The output port 54*d* of this coupled portion is connected through a transition to a coaxial output connector mounted on the underside of board 62 (invisible in the drawing), where the upper sideband output is available.

Varactor 26 and its associated tuner 32 are connected through a suitable transition to port 28*a*, which, it will be seen, is connected by a continuous conductive path through couplers 28 and 46. At the output end of coupler 46 the conductive path is terminated by a resistor 48, applied to board 62 by known thin film techniques. Port 46*d* is connected to ground by a suitable connection to the upper portion of the assembly of FIG. 4. The short portion of the just-described path lying between couplers 28 and 46 constitutes a direct connection between ports 28*c* and 46*c* of couplers 28 and 46, respectively.

Varactor 34 and its associated tuner 40 are connected through a transition to port 38*b* which is connected through a quarter wavelength conductive path to one end of the coupled portion constituting coupler 38. The exit port 38*d* of coupler 38 is connected via a relatively long path 52 to port 54*a*, the conductive path continuing through coupler 54 to port 54*c*. The latter is connected through a transition to a coaxial output connector mounted on the underside of broard 62 (not visible in FIG. 4), where the lower sideband is available.

The length of those portions of the conductive path on one board which are broadside-coupled to corresponding portions of the conductors on the other board which form couplers 28, 38 and 54 are designed to be electrically equivalent, so as to minimize or eliminate undesired phase shifts. For the same reason, the lengths of conductive paths 50 and 52 are also electrically equivalent.

Figure 6:
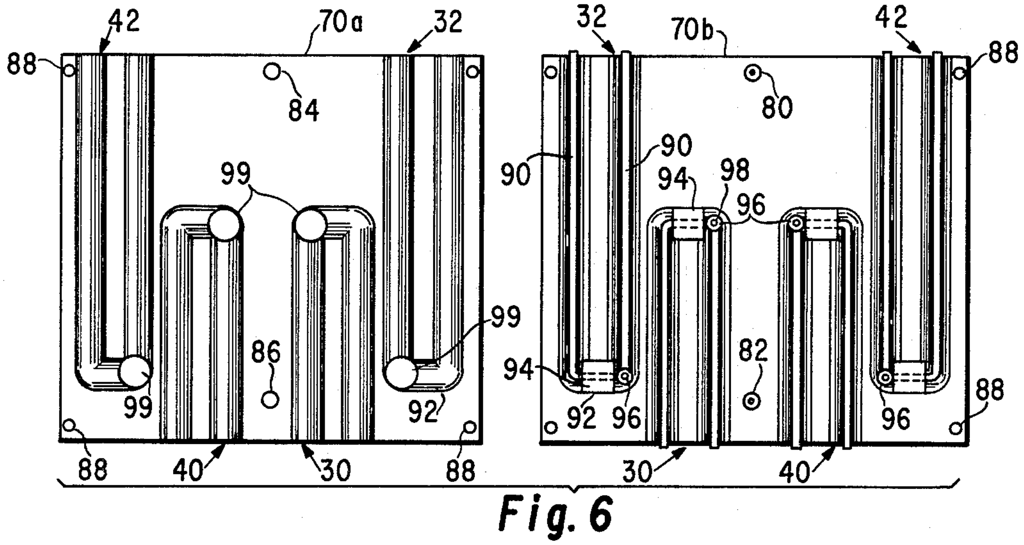
FIG. 6 is an "open-book" plan view of the upper portion of the assembly of FIG. 4.

Referring now to FIGS. 4 and 6, the upper portion of the assembly, the coaxial line portion 70, consists primarily of a pair of mating machined conductive plates 70*a* and 70*b*, which may be formed of aluminum. As shown in FIG. 4, varactors 24, 26, 34 and 36 are supported in suitable holders 72, 74, 76 and 78, respectively, on one surface of plate 70*a*. As best seen in FIG. 6, each of plates 70*a* and 70*b* has a plurality of grooves of semicircular cross-section milled therein, these grooves, when plate 70*a* is folded over on top of plate 70*b*, defining cylindrical openings extending into the assembly from two opposite edges. Accurate registration between the grooves in the two plates is assured by a pair of aligning pins 80 and 82 on plate 70*b* which engage the holes 84 and 86, respectively, in plate 70*a*. The plates are firmly held together as by bolts (not shown) inserted through holes 88 extending through both plates. The cylindrical grooves constitute grounded outer conductors of coaxial transmission lines, the center conductor of which consists of a wire, such as 90, positioned along the axes of the cylindrical bores. The coaxial lines are grouped in pairs, as shown, each pair constituting a double stub coaxial tuner. Considering tuner 42, for example, the center conductors 90 are supported at their free ends by the shorting stubs (FIG. 4) of the tuner, and are connected together at the inner end and supported in the short cylindrical crossbore 92 by a bead 94 of insulating material, such as Teflon. In addition to coaxially positioning the inner conductor, its dielectric contributes toward establishing the proper electrical path length between the elements of the double stub tuner. Without describing each tuner in detail, FIG. 6 illustrates that the elements of double stub tuners 30 and 40 are accessible from one side of the assembly 70 and that tuners 32 and 42 are accessible from the opposite edge of the assembly. The position of the shorting stub (not shown) associated with each of the inner conductors is individually adjustable by plungers extending from the aforesaid opposite edges of the assembly as shown in FIG. 4.

It will be recalled from the description of FIG. 2 that one electrode of each of the varactors 24, 26, 34 and 36 is directly connected to an associated double stub tuner. To facilitate this connection, the inner conductors of the coaxial structure are provided at the end at which they are connected together with a socket 96 having an aperture 98 therein for receiving one of the end terminals of a respective varactor. The varactor holders 72–78 are so positioned on plate 70*a* that when the varactor is concentrically mounted therein an end terminal of the varactor projects through a hole 99 in plate 70*a* and engages a respective socket 96 in the coaxial line structure.

Figure 7:
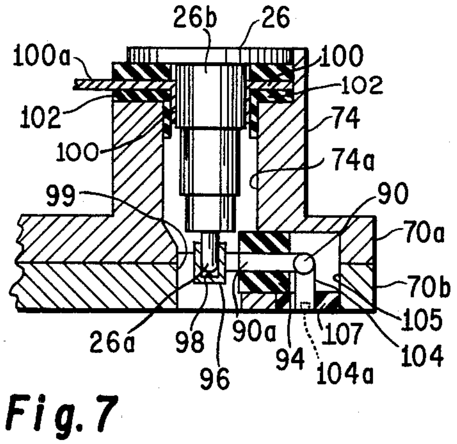
FIG. 7 is an elevation cross-sectional view taken along line 7—7 of FIG. 4.

For a better understanding of the construction of the varactor holders, reference is now made to FIG. 7 which is an elevation cross section of holder 74 taken along line 7—7 of FIG. 4. The varactor holder 74 may be an integral boss on plate 70*a* as shown, and thus formed of conductive material, such as aluminum. The holder 74 is formed with a coaxial bore 74*a* within which the varactor cartridge 26 is coaxially positioned. The pin terminal 26*a* of the varactor is inserted in the aperture 98 of socket 96 which, as was described in connection with FIG. 6, is formed on one of the two inner conductors 90 of the tuner 32. In FIG. 7, the short inner conductor 90*a* centered in insulating bead 94, is the interconnection between the two elements of double stub tuner 32. To facilitate coupling of the modulation signal input from amplifier 10 (FIG. 1) to the band terminal 26*b* of the varactor, there is provided a conductive collar 100 which fits securely about the band terminal and which includes a tab 100*a* to which an input lead may be connected. The varactor and the collar are insulated from the holder 74 by a Teflon insert 102. Besides providing insulation, the Teflon surrounding the band portion of the varactor provides a dielectric which, in conjunction with the band and grounded holder 74 provides a radio frequency bypass capacitor to minimize interference to the modulation source by the carrier signal. At the end of the cross-connecting inner conductor 90*a* opposite from socket 96, a short section of wire 104 secured at one end to conductor 90 extends through a circular opening 105 in plate 70*b*, being centered therein by an insulating bead 107. The free end of wire 104 is provided with a depression 104*a* for receiving a transition for coupling the coaxial line circuit to the strip transmission line assembly 22.

Figure 8:
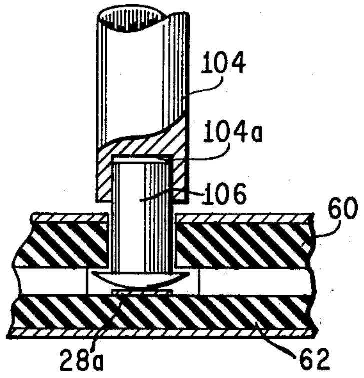
FIGS. 8 and 9 are elevation cross-sectional views, greatly enlarged, of a coaxial line-to-strip transmission line transition employed in the assembly of FIG. 4.

As has been described hereinabove, varactor 26 is connected to port 28*a*, which it will be recalled by reference to FIG. 5, is at the terminus of one of the conductive paths on the upper surface of printed circuit board 62. Referring to FIG. 8, the center conductor 104 of FIG. 7, greatly enlarged, is formed with a depression 104*a* at its free end to receive a cylindrical rivet 106 which is conductively secured to the conductive path on the lower board 62 and projects through the upper printed circuit board 60. The head of the rivet makes contact with the conductive path, and is preferably soldered thereto to insure good contact. Soldering may be accomplished by applying flux and solder about the rivet head and with the two boards firmly held together, applying a soldering iron to the portion of the rivet projecting above board 60. The sides of the depression 104*a* firmly engage the projecting portion of the rivet thereby making firm electrical connection between conductor 90 (FIG. 7) and the conductive path on the strip transmission line.

Figure 9:
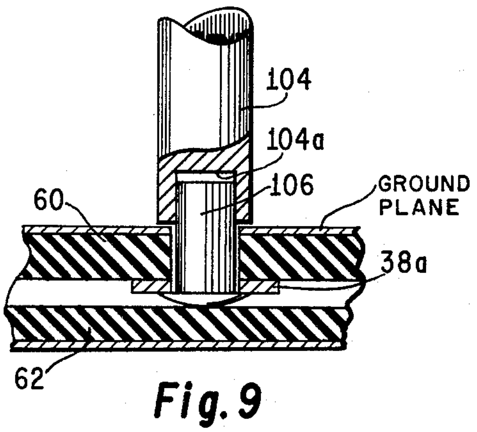

FIG. 9 shows how the structure of FIG. 8 is modified when it is necessary to make connection from a varactor to a conductive strip on the underside of the upper printed circuit board 60, for example, to port 38*a*. In this case the inside of the head of rivet 106 engages the conductive path 38*a* on circuit board 60, with the projecting portion of the rivet received by the depression in the lower end of conductor 104. One or the other of the transitions shown in FIGS. 8 and 9 is used to couple the carrier signal input connector to the appropriate port in assembly 22, and to connect the ports 54*c* and 54*d* to the coaxial output connectors from which the two single sideband suppressed carrier outputs are available. In this case it is necessary only to form a depression in the lower end of the center conductor pin of the coaxial connector for receiving the rivet 106.

From the foregoing description it will be seen that the objective of a compact and light weight modulator package is achieved by the integration of strip transmission line and coaxial transmission line packaging techniques. Moreover, the varactors are readily assessible for replacement; it is necessary only to remove the Teflon insert 102 and collar 100 to remove the varactor. Likewise, control of the double stub tuners is conveniently accessible from outside the assembly. In an assembly constructed in accordance with the foregoing description, and in which non-linear capacitance diodes were used, single sideband suppressed carrier modulation at microwave frequencies was achieved by relatively high power level modulation much more efficiently than has been achieved heretofore in modulators using waveguide and non-linear resistance diodes. With an input carrier power of 600 milliwatts at 2250 megacycles, the desired single sideband output was 8 db below the carrier input, as compared to a 11–12 db conversion loss experienced with waveguide construction. The unwanted sideband and carrier frequencies were suppressed 20 db and 37 db respectively, below the desired sideband. It was observed also that by sacrificing an increase in conversion loss of one db it was possible to increase the sideband suppression to equal the suppression of the carrier.

While there has been described what is now considered a preferred embodiment of the invention, modifications and details within the spirit and scope of the invention will now be suggested to ones skilled in the art. It is applicant's intention, therefore, that the invention not be limited to what has been shown and described except as such limitations appear in the appended claims.

What is claimed is:

1. A single sideband suppressed carrier modulator comprising, in combination, first and second balanced modulators each including a hybrid coupler having first and second input ports and first and second output ports, the first input port of each of said couplers having in series therewith a conductor of length equal to an odd multiple of a quarter wavelength at the frequency of the carrier, and a varactor connected to each of said first and second input ports; means for applying a modulation signal of reference phase to both varactors of said first balanced modulator, means for applying said modulation signal, shifted 90° relative to said reference phase, to both varactors of said second balanced modulator; a third hybrid coupler having two input ports and two output ports, means connecting said first output port of the coupler in said first balanced modulator to one output port of said third coupler, means connecting said first output port of the coupler in said second balanced modulator to the other output port of said third coupler, means for applying a carrier signal to one of the input ports of said third coupler, and a loading means connected to the other input port of said third coupler, said third coupler being operative to couple said carrier at a reference phase to said first balanced modulator and at quadrature phase to said second balanced modulator; a fourth hybrid coupler having first and second input ports and first and second output ports; and connections of equal electrical length between the second output ports of the couplers in said first and second balanced modulators to the first and second input ports of said fourth coupler, respectively, the first input port of said fourth coupler having in series therewith a conductor of length equal to a quarter wavelength at the frequency of the carrier, said fourth coupler being operative to combine the signals from said first and second modulators to produce upper and lower sidebands at said first and second output ports, respectively.

2. A modulator in accordance with claim 1 wherein said hybrid coupler and said quarter wavelength conductors are contained in a unitary strip transmission line assembly, and further including a double-stub tuner in circuit relationship with each of said varactors for matching the varactor to its respective hybrid coupler, said double-stub tuners being formed in a conductive plate assembled in contiguous parallel relationship with said strip transmission line assembly, and including coaxial line-to-strip transmission line transitions from said tuners to said strip transmission line.

3. A modulator in accordance with claim 2 wherein said varactors are of the cylindrical cartridge type, holders on the surface of said conductive plate opposite from said strip transmission line assembly for supporting said varactors with their long axis normal to the plane of said strip transmission line assembly, means connecting one terminal of each of said varactors to a point on a respective one of said double-stub tuners, and including tuning controls for said double-stub tuners projecting from two opposite edges of and lying in the plane of said conductive plate.

4. A single sideband suppressed carrier modulator comprising, in combination: first and second balanced modulators each including a strip transmission line 3 db hybrid coupler having first, second, and third conductor arms of equal electrical length and a fourth conductor arm which includes an additional length of conductor equal to an odd multiple of a quarter wavelength at the frequency of the carrier, said arms terminating in corresponding ports, and first and second oppositely poled varactors respectively connected to the corresponding ports of said second and fourth coupler arms; means for applying a modulation signal of reference phase to both varactors of said first balanced modulator, means for applying said modulation signal, shifted 90 degrees relative to said reference phase, to both varactors of said second balanced modulator; a third strip transmission line 3 db coupler having two input ports and two output ports, means connecting the port corresponding to said first arm of the coupler in said first balanced modulator to one output port of said third coupler, means connecting the port corresponding to said first arm of the coupler in said second balanced modulator to the other output port of said third coupler, means for applying a carrier signal to one of the input ports of said third coupler, and loading means connected to the other input port of said third coupler, said third coupler being operative to couple said carrier at a reference phase to said first balanced modulator and at quadrature phase to said second balanced modulator, each of said first and second balanced modulators being operative to generate therein double sideband output signals at the ports corresponding to the third arms of the couplers; a fourth strip transmission line 3 db hybrid coupler having first, second, and third conductor arms of equal electrical length and a fourth conductor arm which includes an additional length of conductor equal to an odd multiple of a quarter wavelength at the frequency of the carrier, said arms terminating in corresponding ports; and, connections of equal electrical length between the ports corresponding to the third arms of the couplers in said first and second balanced modulators to the ports corresponding to the fourth and second arms of said fourth coupler, respectively, said fourth coupler being operative to combine the signals from said first and second modulators to produce upper and lower sidebands at the ports corresponding to said third and first arms, respectively.

5. A modulator in accordance with claim 4 wherein said couplers and the interconnections therebetween are formed by confronting conductive paths on a pair of insulative boards assembled with a sheet of insulating dielectric material sandwiched therebetween, thereby providing broadside-coupling of the portions of the conductive paths forming the couplers, the portions of the conductive paths on one board which are broadside-coupled to corresponding portions of conductors on the other board being electrically equivalent.

6. A modulator in accordance with claim 5 including a conductive plate conforming in size and shape with said boards assembled in contiguous parallel relationship with said boards, said plate including means for supporting said varactors for connection with their respective couplers, said plate having a plurality of cylindrical bores formed therein extending inwardly from two opposite edges thereof parallel to the flat surfaces of said plate, conductors supported in said cylindrical bores which with the walls of the bores form the inner and outer conductors, respectively, of four coaxial line double stub tuners, said inner conductors including means for connecting a varactor to a respective one of said tuners, said conductive plate having holders on the surface thereof remote from said strip transmission line for removably securing said varactors in assembled relationship with said tuners, and plungers extending from the cylindrical bores in said conductive plate for adjusting said tuners.

References Cited by the Examiner

UNITED STATES PATENTS

| | | | |
|---|---|---|---|
| 3,020,493 | 2/1962 | Carroll | 332—30 |
| 3,029,396 | 4/1962 | Sichak | 332—47 X |

FOREIGN PATENTS

| | | |
|---|---|---|
| 621,223 | 4/1949 | Great Britain. |

ROY LAKE, *Primary Examiner.*

ALFRED L. BRODY, *Assistant Examiner.*